United States Patent [19]

Henning et al.

[11] 4,377,815
[45] Mar. 22, 1983

[54] RECORDING DEVICE

[75] Inventors: Hans-Georg Henning, Otterfing; Wolfgang Sebert, Holzkirchen, both of Fed. Rep. of Germany

[73] Assignee: Vermes Chemie GmbH & Co. KG., Ludwigshafen, Fed. Rep. of Germany

[21] Appl. No.: 292,026

[22] Filed: Aug. 11, 1981

Related U.S. Application Data

[63] Continuation of Ser. No. 71,297, Aug. 30, 1979, abandoned.

[30] Foreign Application Priority Data

Sep. 12, 1978 [DE] Fed. Rep. of Germany ....... 2839664

[51] Int. Cl.³ .......................................... G01D 15/16
[52] U.S. Cl. ............................................... 346/140 R
[58] Field of Search ........................ 346/140 R, 140 A

[56] References Cited

U.S. PATENT DOCUMENTS 3,299,436  1/1967  Behmoras et al. ............... 346/140 R
3,441,950  4/1969  Miller .............................. 346/140 A
3,452,361  6/1969  Williams, Jr. ................... 346/140 R

*Primary Examiner*—George H. Miller, Jr.
*Attorney, Agent, or Firm*—Toren, McGeady and Stanger

[57] ABSTRACT

In a recording device one end of a flexible, wear-resistant capillary tube is located in an ink reservoir while its other end forms a recording tip and is fastened to a movable carriage. The capillary tube draws ink out of the reservoir and conveys it to the recording tip.

7 Claims, 1 Drawing Figure

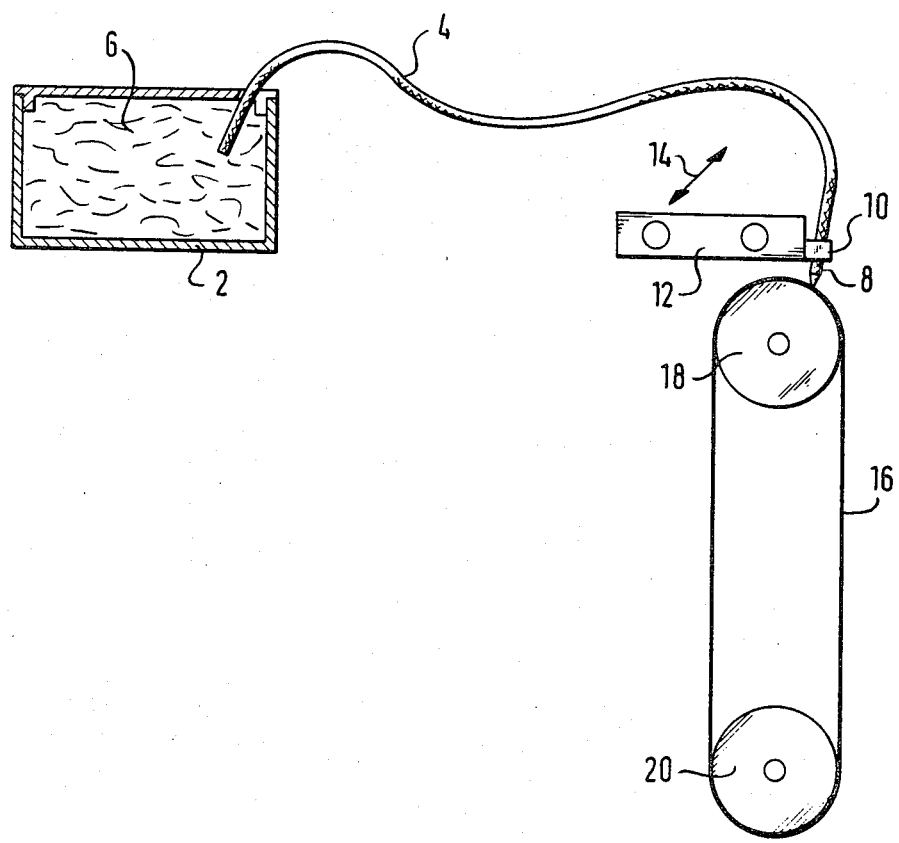

RECORDING DEVICE

This is a continuation of application Ser. No. 071,297 filed on Aug. 30, 1979, now abandoned.

SUMMARY OF THE INVENTION

The present invention is directed to a recording device, in particular measuring and registering devices, and includes an ink reservoir and a capillary tube having one end in the reservoir from which it draws out ink.

There are known recording devices which contain a rigid capillary tube with the tube being rigidly connected to an ink reservoir. As a result, the ink reservoir must be moved together with the capillary tube during recording operations. Such an arrangement causes difficulties in many recording instruments, since either there is not enough space in the region of the recording arm for an ink reservoir of sufficient size and/or there is not enough driving force available for moving an ink reservoir of sufficient size along with the recording arm.

To avoid such difficulties, recording devices have been developed in which the ink is supplied to a so-called recording tip either directly from an ink reservoir or through an intermediate piece of metal by means of a flexible hose. Conventionally, such a recording tip is formed of a high grade steel possibly with an insert of precious stone, glass, ceramics or other material.

Generally, the known recording devices of the type mentioned above are quite sensitive to variations in temperature and air pressure and to changes of the ink level in the reservoir and of the position in the operative state. Moreover, such a recording device is usually quite expensive, requires considerable maintenance, and the replacement of components is cumbersome and frequently results in contamination.

In other known devices felt or fiber recording pens are used. The devices include a housing containing a filler material of relataively low capillarity and the material is impregnated with ink. One end of a bundle of plastic fibers extends into the filler material. The plastic fibers are glued or welded together or instead an extruded plastic tube can be used closed along its exterior surface and with its interior containing a plurality of capillaries of various configurations. Alternatively, a strand of foamed plastic material containing capillaries connected to one another can be used. Each of the fiber bundle, the plastic tube or the strand has a higher capillarity than the filler material impregnated with the ink, accordingly, they automatically transport the ink from the filler material toward their free ends where the ink can be transferred, without the use of a special recording tip, to a recording surface. Such a felt or fiber-tipped recording pen forms a unit which can be quickly replaced and does not require any maintenance. Felt or fiber-tipped recording pens can be transported and used in any position without spilling any ink and they automatically regulate the ink flow within a wide range of temperature and air pressure. Such pens are ready for use immediately after the removal of a cap which protects the ink outlet end.

In such previously known felt or fiber-tipped recording pens, however, the fiber bundle, the plastic tube or the plastic foam strand used as the capillary for transporting ink from the filler material to the ink outlet end has such a high degree of stiffness that it is practically rigid. Accordingly, as in the above-mentioned type of recording device, the ink reservoir must be moved along with the recording arm so that the above described disadvantages occur. Therefore, in many measuring devices where the space around the recording arm is insufficient or where the driving force inadequate, such as in round chart recorders with several indicators, meteorological recorders and other recorders, felt or fiber-tipped recording tips cannot be used as the recording means or if they are used they provide insufficient recording capacity.

Therefore, it is the primary object of the present invention to provide an especially simple recording device of the general type mentioned above which, in a simple and inexpensive manner, affords a flexible connection between the ink reservoir and the recording tip.

In accordance with the present invention, the recording device is characterized by a capillary tube formed of a flexible, wear-resistant material with the end of the tube spaced from the ink reservoir being in the form of a recording tip and fastened to a recording arm which is movable relative to the reservoir.

Consequently, according to the invention, the capillary tube itself not only serves for automatically drawing the ink from the ink reservoir which is provided with an air compensating opening, but it also carries the ink to the recording tip and also forms the recording tip. In spite of providing these features, the capillary tube is flexible so that it permits a desirable stationary arrangement of the ink reservoir. It is of no particular significance whether the ink reservoir is a known, hollow housing filled with ink or a housing containing a filler material impregnated with ink. It must be ensured that the inlet end of the flexible capillary tube extends into the liquid ink or the filler material of lower capillarity impregnated with ink and an air compensating opening must be provided at a suitable location.

In a preferred embodiment, to ensure its flexibility, the capillary tube has an external diameter of less than 0.8 mm, preferably less than 0.6 mm. It has been found to be especially advantageous to form the capillary tube of a plastics material, preferably polyacetal. Such a capillary tube may have a length of up to 500 mm. Based on known plastic recording tips, the interior of a capillary system must be provided with a uniform structure over its entire length. Moreover, the capillary tube (plastic recording tip) must be ink-tight along its exterior.

If it is necessary at all, the required maintenance for such a recording device is small. The design of the recording device is extremely simple. There are no costly features as in known recording tips for capillary pens which employ high grade steel and the like. The assembly requirements for such a recording device are comparable to those of known felt recording pens and are significantly reduced as compared to known recording devices. Th ink reservoir and the capillary tube are easily replaceable either individually or together. Further, the ink reservoir and capillary tube are inexpensive. Accordingly, the subject matter of the present invention is suitable as a disposable recording system similar to felt or fiber-tipped recording pens.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing a schematic illustration, partly in section, is provided of a recording device embodying the present invention.

DETAIL DESCRIPTION OF THE INVENTION

As illustrated in the drawing, the recording device includes a stationary ink reservoir 2 with a capillary tube 4 extending into the reservoir for withdrawing ink. A filler material 6 of relatively low capillarity is contained within the ink reservoir 2. The filler material 6 can be impregnated with ink. Capillary tube 4 always has a higher capillarity than the filler material 6 so that the capillary tube draws the ink out of the filler material. Capillary tube 4 is formed of a flexible, sufficiently wear-resistant material and, in a preferred embodiment, has an external diameter of 0.55 mm. Capillary tube 4 has an outlet end 8 in the form of a recording tip spaced from the ink reservoir and secured to a support 10 on a recording carriage 12. The recording carriage 12 is movable back and forth in the direction of the double arrow 14. The carriage moves on tracks, not shown. The recording tip is positoned over the surface of a registering paper 16. The paper 16 is guided around two spaced rollers 18, 20.

While specific embodiments of the invention have been shown and described in detail to illustrate the application of the inventive principles, it will be understood that the invention may be embodied otherwise without departing from such principles.

What is claimed is:

1. Recording device, particularly for measuring and registering devices and the like for supplying ink on a registering surface for effecting a record, comprising an ink reservoir, a capillary tube having a first end and a second end with the first end located within said ink reservoir for suctioning ink therefrom by its capillary action and the second end spaced outwardly from said ink reservoir, said capillary tube is formed for the entire length from the first end to the second end of a flexible, wear-resistant plastics material, said plastics material is polyacetal, said second end of said capillary tube comprising a recording tip for supplying ink suctioned by said capillary tube directly from said capillary tube to the registering surface on writing contact of said recording tip with the registering surface, a carriage movable relative to said ink reservoir, said second end of said capillary tube is secured to said carriage for movement therewith so that said second end can traverse the registering surface, and said capillary tube has a uniform interior structure for the length thereof from said first end to said second end.

2. Recording device, as set forth in claim 1, wherein the outside diameter of said capillary tube is less than 0.8 mm.

3. Recording device, as set forth in claim 1, wherein the outside diameter of said capillary tube is less than 0.6 mm.

4. Recording device, as set forth in claim 1, wherein the outside diameter of said capillary tube is 0.55 mm.

5. Recording device, as set forth in claim 1, wherein said capillary tube comprises an extruded tube of plastics material.

6. Recording device, as set forth in claim 1, wherein a filler material is located within said ink reservoir and has a lower capillarity than said capillary tube, and said filler material being capable of holding ink.

7. Recording device, as set forth in claim 1, including a stationary registering device, said carriage being movable in a reciprocating manner relative to said registering device.

* * * * *